United States Patent
Wilcox et al.

(10) Patent No.: US 7,181,242 B2
(45) Date of Patent: Feb. 20, 2007

(54) SYSTEMS AND METHODS FOR COMMUNICATING DATA AT RADIO BASE STATION NODES

(75) Inventors: John Wilcox, Morrisville, NC (US); Johnny Shepherd, Hillsborough, NC (US); Joseph Repice, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 769 days.

(21) Appl. No.: 10/011,666

(22) Filed: Oct. 29, 2001

(65) Prior Publication Data

US 2003/0083071 A1    May 1, 2003

(51) Int. Cl.
*H04Q 7/20* (2006.01)

(52) U.S. Cl. .................... 455/561; 455/560; 455/550.1

(58) Field of Classification Search ................ 455/561, 455/560, 524, 525, 445, 502, 450, 7, 432.1, 455/432.2, 436, 438, 439, 443, 448, 442.1, 455/517; 379/230, 229, 221.06, 221.07, 379/242, 268; 370/395.5, 328, 331

See application file for complete search history.

(56) References Cited

U.S. PATENT DOCUMENTS

| | | | |
|---|---|---|---|
| 5,526,397 A | 6/1996 | Lohman | 379/58 |
| 5,909,469 A | 6/1999 | Frodigh et al. | 375/302 |
| 6,108,316 A | 8/2000 | Agrawal et al. | 370/311 |
| 6,138,037 A | 10/2000 | Jaamies | 455/560 |
| 6,141,535 A | 10/2000 | Ayerst | 455/31.1 |
| 6,317,423 B1 | 11/2001 | Jantti et al. | 370/347 |
| 6,496,694 B1* | 12/2002 | Menon et al. | 455/561 |
| 6,668,161 B2 | 12/2003 | Boros et al. | |
| 6,826,386 B2 | 11/2004 | Doi | |
| 2002/0082014 A1* | 6/2002 | Andersson et al. | 455/561 |
| 2003/0036401 A1* | 2/2003 | Leppa et al. | 455/561 |
| 2003/0139152 A1 | 7/2003 | Doi et al. | |
| 2004/0028015 A1* | 2/2004 | Fouilland et al. | 370/337 |
| 2005/0094667 A1 | 5/2005 | Dahlman et al. | |

FOREIGN PATENT DOCUMENTS

| | | |
|---|---|---|
| EP | 0830 041 | 3/1998 |
| EP | 0899 899 | 3/1999 |

(Continued)

OTHER PUBLICATIONS

Fabio Longoni et al; *Radio Access Network Architecture; WCDMA for UMTS Access for Third Generation Mobile Communications*; John Wiley & Sons, GB, pp. 53-71 XP-002228672.

(Continued)

*Primary Examiner*—Jean Gelin
(74) *Attorney, Agent, or Firm*—Myers Bigel Sibley & Sajovec (57) ABSTRACT

Carrier data can be communicated between a carrier interface of the first radio base station node and a mobile switching center over a carrier bus according to a carrier protocol. In addition, bus data can be communicated between a bus interface of the first radio base station node and a second radio base station node over a radio base station bus according to a radio base station protocol that is different from the carrier protocol. Related radio communications systems and nodes are also discussed.

14 Claims, 2 Drawing Sheets

FOREIGN PATENT DOCUMENTS

| WO | WO94/22245 | 9/1994 |
| WO | WO 94/22245 | 9/1994 |
| WO | WO 01/052432 | 7/2001 |

OTHER PUBLICATIONS

PCT International Search Report for PCT/US 02/33760 filed Oct. 22, 2002.

PCT International Search Report for PCT/US 02/32293 filed Oct. 15, 2002.

Written Opinion of the International Preliminary Examining Authority for PCT application No. PCT/US02/33760 mailed on Nov. 2, 2005.

* cited by examiner

SYSTEMS AND METHODS FOR COMMUNICATING DATA AT RADIO BASE STATION NODES

RELATED APPLICATIONS

The present application is related to U.S. application Ser. No. 10/011,669 entitled "METHODS AND SYSTEMS FOR COMMUNICATING DATA AT RADIO BASE STATION NODES THAT PROVIDE EFFICIENT ALLOCATION OF CONTROL CHANNELS" and filed concurrently herewith. The disclosure of U.S. application Ser. No. 10/011,669 is hereby incorporated herein in its entirety by reference.

BACKGROUND OF THE INVENTION

The present invention relates to the field of communications and more particularly to radio communications.

In conventional radio telephone communications systems, control, voice, and data information from a mobile switching center is received at a radio base station via a carrier protocol such as a T1, E1, or J1 carrier protocol. Each carrier protocol can support a fixed number of channels or timeslots for communicating control, voice, and data information between the mobile switching center and a radio base station. Within a radio base station, the control, voice, and data information from the mobile switching center is received at a control board interface, and portions of this data can be communicated with other base station control boards and/or other base station devices using a bus interface of the same type as that used for the carrier from the mobile switching center.

For example, a conventional radio base station that communicates with a mobile switching center using the T1 carrier protocol generally will also use the T1 carrier protocol for the bus interface between control boards. The carrier protocol used to support communications between a mobile switching center and a radio base station may be dictated by commercial availability, and conventional base stations generally use this same protocol for the internal bus interface. In the United States, for example, T1 lines are generally commercially available and are thus generally used to couple radio base stations and mobile switching centers. Accordingly, the T1 carrier protocol is used for radio base station internal buses as all control board interfaces support the same carrier protocol.

SUMMARY OF THE INVENTION

According to embodiments of the present invention, systems and methods are provided for communicating data at radio base station nodes. Carrier data can be communicated between a carrier interface of a first radio base station node and a mobile switching center over a carrier bus according to a carrier protocol. In addition, bus data can be communicated between a bus interface of the first radio base station node and a second radio base station node over a radio base station bus according to a radio base station protocol that is different from the carrier protocol.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
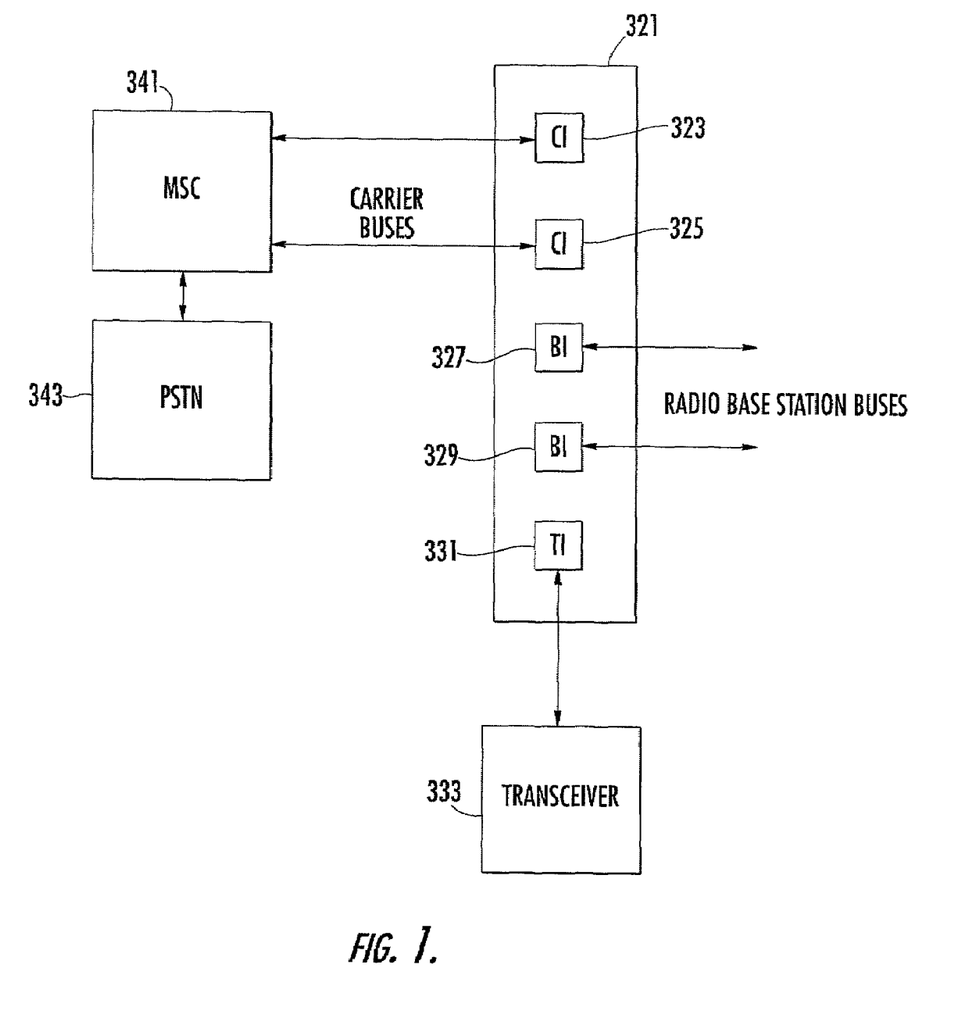
FIG. 1 is a block diagram illustrating radio base station nodes and methods according to embodiments of the present invention.

As shown in FIG. 1, a radio base station of a radiotelephone communications system can include a radio base station node 321 with carrier interfaces (CI) 323 and 325, bus interfaces (BI) 327 and 329, and transceiver interface (TI) 331. As shown, each carrier interface can be used to communicate carrier data with the mobile switching center (MSC) 341 over respective carrier buses, and each bus interface can be used to communicate bus data with other radio base station nodes over a radio base station bus. In addition, transceiver data for the transceiver 333 can be communicated between the radio base station node 321 and the transceiver 333 through the transceiver interface 331. Accordingly, the radio base station node 321 can support wireless communications with one or more user terminals through transceiver 333 and the mobile switching center 341, the Public Switched Telephone Network (PSTN) 343, and/or another radio base station node.

Carrier data can be communicated between one or more carrier interfaces 323 and 325 of the radio base station node 321 and the mobile switching center 341 according to a carrier protocol, and bus data can be communicated between one or more bus interfaces 327 and 329 of the radio base station node 321 and one or more other radio base station nodes according to a radio base station protocol that is different than the carrier protocol. For example, each carrier bus between the base station node and the mobile switching center can be operated according to one of the T1 protocol (standard in the U.S.), the J1 protocol (standard in Japan), and the E1 protocol (standard in Europe), and each radio base station bus can be operated according to another of the T1, J1, and E1 protocols. Moreover, carrier interfaces 323 and 325 may operate according to different protocols and bus interfaces 327 and 329 can operate according to different protocols. In other words, the protocol for each interface can be selected independently.

According to a particular embodiment, each carrier bus can be operated according to the T1 protocol using leased T1 lines which are commercially available in the United States, and the internal radio base station bus can be internally provided by the radio telephone communications system and operated at a higher data rate protocol such as the E1 or J1 protocols. In the United States, for example, T1 lines are commonly leased to provide the carrier bus(es) between a mobile switching center and radio base stations of a radiotelephone communications system. Radio base station buses interconnecting radio base station nodes, however, are generally internal to the radiotelephone communications system and thus need not rely on a protocol dictated by providers of leased lines.

More particularly, carrier data communicated between the radio base station node 321 and the mobile switching center 341 over one or more carrier buses can include control data such as operation and maintenance ("O&M") data for the radio base station node 321 and other radio base station nodes coupled to the bus interfaces 327 and 329. The carrier data can also include user payload data for communications with user terminals.

User payload data communicated over the carrier buses can be used to support communications with user terminals through the transceiver 333 coupled to the radio base station node 321 and/or to support communications with user terminals through transceivers coupled to other radio base station nodes coupled to the bus interfaces 327 and 329 through the radio base station buses. For example, user payload data can be used to support voice or internet communications with a user terminal.

User payload data communicated between the radio base station node 321 and the mobile switching center 341 through the carrier interfaces 323 and 325 supporting communications through transceiver 333 does not necessarily communicate over the radio base station buses from bus interfaces 327 and 329. User payload data communicated between the radio base station node 321 and the mobile switching center 341 through the carrier interfaces 323 and 325 supporting communications through transceivers associated with other radio base station nodes can be communicated to the other radio bases station nodes over the radio base station buses using bus interfaces 327 and 329.

The control data communicated between the radio base station node 321 and the mobile switching center 341 over one or more carrier buses can include operation and maintenance ("O&M") data for the radio base station node 321 and other radio base station nodes coupled to the bus interfaces 327 and 329 as discussed above. The control data can also include messaging data such as short message service (SMS) data and/or pages for user terminals serviced by the transceiver 333 or other transceivers associated with other radio base station nodes coupled to the radio base station buses. According to aspects of the present invention, all control data communicated over the carrier buses can be communicated over the radio base station buses whether the control data is for use by the radio base station node 321 or for use by another radio base station node coupled to the radio base station buses.

While the radio base station node 321 of FIG. 1 is illustrated with two carrier interfaces 323 and 325 each coupled to the mobile switching center 341 via respective carrier buses, a radio base station node according to the present invention can include only a single carrier interface or can include three or more carrier interfaces. Moreover, a radio base station node according to the present invention can include unused carrier interfaces that are not coupled to the mobile switching center. A radio base station node according to the present invention, for example, may include two carrier interfaces, one of which may be unused if the additional capacity is not required for the application for which it is being used. A radio base station node in a relatively high traffic base station may require coupling of all carrier interfaces, while a radio base station node in a lower traffic base station may not have carrier buses coupled to all carrier interfaces.

The radio base station node 321 may also support more than one transceiver. Alternatively, a radio base station node according to the present invention may not have any transceivers coupled thereto. A radio base station node, for example, may be used to provide additional capacity and/or redundancy with respect to carrier buses to the mobile switching center without requiring coupling of a transceiver directly thereto. In a radio telephone communications system with sufficient transceivers, an additional radio base station node could be added into a radio base station bus to provide additional buses to the mobile switching center without adding an additional transceiver.

The radio base station node 321 can be provided on a single control board and/or circuit. Alternatively, the functionality of the radio base station node can be provided on multiple boards and/or circuits. In addition, a board and/or circuit providing functionality of the radio base station node can provide additional functionality.

Radio base station nodes according to embodiments of the present invention can support use of different bus protocols over the carrier bus and the radio base station bus by using separate Framers and Field Programmable Gate Arrays at each of the carrier interfaces 323 and 325 and at each of the bus interfaces 327 and 329. Accordingly, each interface type can be defined independently. With applications in the United States, for example, the carrier interfaces 323 and 325 can be defined to support 24 PCM timeslots per frame according to the T1 protocol thereby allowing use of commercially available T1 lines to provide carrier buses. The bus interfaces 327 and 329 of the same radio base station node can be defined to support a higher data rate of 32 PCM timeslots per frame according to the E1 protocol over the radio base station bus which is internal to the radio telephone communications system. A number of timeslots available for passing voice and data traffic between radio base station nodes can thus be increased.

Figure 2:
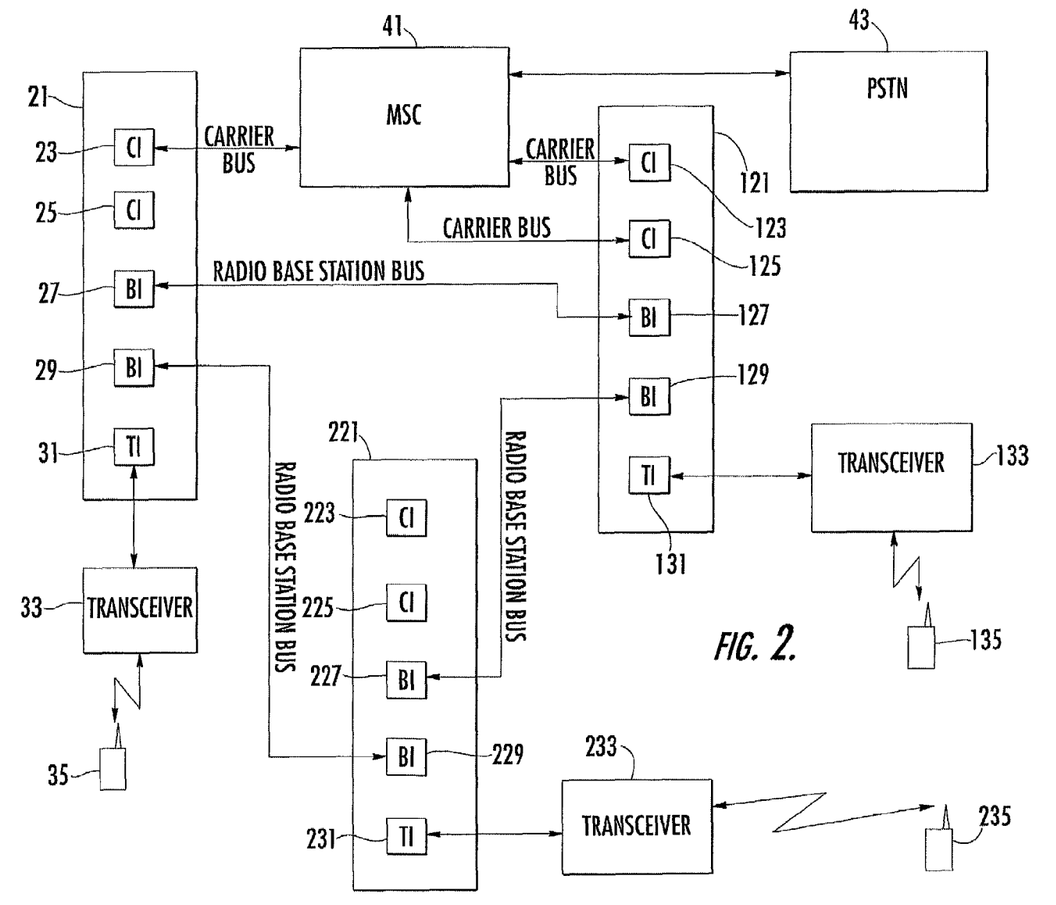
FIG. 2 is a block diagram illustrating a radio communications systems and methods according to embodiments of the present invention.

A radio telephone communications system including a plurality of radio base station nodes 21, 121, and 221 is illustrated in FIG. 2. As shown, each radio base station node 21, 121, and 221 can be associated with a respective transceiver 33, 133, and 233 or group of transceivers to provide wireless communications with respective user terminals 35, 135, and 235. While a single user terminal is shown in communication with each transceiver, it will be understood that each transceiver may provide communications with a plurality of user terminals and that there may be times when a transceiver is not providing communications with any user terminals. In the example of FIG. 2, each transceiver or group of transceivers may be used to provide service over a 120 degree sector of a single radio base station so that each of the illustrated transceivers and radio base station nodes is part of a single 3-sector base station. Alternatively, one or more of the radio base station nodes and transceivers may be part of a separate base station. In addition, the radio base station bus can be used to couple any number of radio base station nodes other than three. A system according to the present invention may also include additional radio base station nodes defining separate radio base station buses. While a single transceiver is illustrated as being coupled to each node through a transceiver interface to provide service over a sector, a group of transceivers can be coupled to a radio base station node to provide service over a sector.

As shown in FIG. 2, each radio base station node coupled by the radio base station bus can be coupled to no carrier buses (radio base station node 221), coupled to a single carrier bus (radio base station node 21), or coupled to more than one carrier bus (radio base station node 121) according to levels of capacity and/or redundancy desired for each radio base station node. As discussed above, the mobile switching center 41 can communicate control and user payload information over each of the carrier buses with the carrier interface 23 of radio base station node 21 and the carrier interfaces 123 and 125 of radio base station node 131. Control data communicated over a carrier bus at either radio base station node 21 or 121 can be communicated over the radio base station bus with each of the radio base station nodes so that all radio base station nodes on the radio base station bus receive all control data.

Not all user payload data, however, is necessarily communicated over the radio base station bus. User payload data communicated using carrier interface 23 to support communications with user terminal 35 using transceiver 33, for example, is not required to be communicated over the radio base station bus thereby preserving bandwidth on the radio base station bus. User payload data communicated using carrier interface 23 to support communications with user terminal 235 using transceiver 233, for example, can be communicated over the radio base station bus using bus interface 29 and bus interface 229. Alternatively, user payload data communicated using carrier interface 23 to support communications with user terminal 235 using transceiver 233 can be communicated over the radio base station bus using bus interface 27, radio base station node 121 and bus interface 227.

Redundancy can thus be provided in the radio base station bus in that there are multiple paths from any radio base station node on the bus to any other base station node on the bus. Accordingly, a disconnection of any single leg of the radio base station bus of FIG. 2 need not prevent communication between any of the three radio base station nodes on the radio base station bus. Redundancy can also be provided in that disconnection of any one of the carrier buses need not prevent all communication between any radio base station nodes and the mobile switching center 41. If the carrier bus connected to the carrier interface 23 is disconnected, for example, control and user payload data can still be received at the radio base station node 21 through the radio base station node 121 and the radio base station bus.

As shown in the embodiments of FIG. 2, a radio base station bus can include three legs in a bus linking three radio base station nodes. As shown, the radio base station bus can include a first leg between bus interface 27 of radio base station node 21 and bus interface 127 of radio base station node 121, a second leg between bus interface 29 of radio base station node 21 and bus interface 229 of radio base station node 221, and a third leg between bus interface 129 of radio base station node 121 and bus interface 227 of radio base station node 221. Additional nodes could be provided with corresponding additional legs of the radio base station bus.

According to aspects of the present invention, the radio base station bus, coupling bus interfaces 27, 127, 129, 227, 229, and 29, can be used to communicate data according to a radio base station protocol that is different than a carrier protocol used to communicate data over carrier buses between the mobile switching center 41 and the carrier interfaces 23, 123, and 125. The carrier protocol can be a protocol supported by commercially available data lines, such as T1 lines, used to couple mobile switching centers with radio base stations, while the radio base station protocol can be a higher data rate protocol such as the E1 or J1 protocol.

By providing a higher data rate on the radio base station bus, a higher level of redundancy can be provided in the system. If communication between carrier interface 23 of radio base station node 21 and the mobile switching center 41 is interrupted, for example, a higher data rate radio base station bus can provide a lesser restriction on the redundant data path from the mobile switching center 41 through radio base station node 121 and the radio base station bus to the radio base station node 21. Performance degradations resulting from interruption of one or more data paths in a radio telephone communications system can thus be reduced. In addition, higher levels of performance may be achieved for radio base station nodes, such as node 221, which are not directly coupled with the mobile switching center 41.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A radio communications system comprising:
   a first radio base station node including a first carrier interface and a first bus interface wherein the first carrier interface is configured to communicate carrier data between the first radio base station node and a mobile switching center over a carrier bus according to a carrier protocol, and wherein the bus interface is configured to commumcate over a radio base station bus according to a radio base station protocol that is different from the carrier protocol; and
   a second radio base station node including a second bus interface wherein the second bus interface is configured to communicate over the radio base station bus according to the radio base station protocol wherein the carrier data includes user payload data for the second radio base station node, wherein the user payload data for the second radio base station node is coupled between the radio base station bus and the carrier bus through the first carrier interface and the first bus interface of the first radio base station node so that the user payload data for the second radio base station node is communicated as bus data over the radio base station bus wherein the carrier data includes user payload data for the first radio base station node and wherein the user payload data for the first radio base station node is not communicated over the radio base station bus.

2. The radio communications system according to claim 1 wherein the carrier data includes control data for the first and second radio base station nodes and wherein the control data for the first and second radio base station nodes is coupled between the radio base station bus and the carrier bus so that the control data for the first and second radio base station nodes is communicated over the radio base station bus.

3. The radio communications system according to claim 1 wherein the carrier data protocol and the radio base station protocol provide different data rates.

4. The radio communication system according to claim 3 wherein the data rate for the radio base station protocol is higher than the data rate for the carrier protocol.

5. The radio communication system according to claim 1 further comprising:
   communicating transceiver data between a transceiver interface of the first radio base station node and a transceiver coupled to the first radio base station node.

6. The radio communications system according to claim 5 wherein the transceiver data comprises user payload data communicated between the transceiver and a user terminal wherein the user payload data is coupled between the carrier bus and the transceiver through the first carrier interface of the first radio base station node and the transceiver interface of the first radio base station node without coupling to the radio base station bus.

7. The radio communications system according to claim 6 wherein the carrier data comprises the user payload data.

8. A radio base station node in a radio communication system, said system further comprising a second radio base station node comprising a second bus interface configured to communicate over a radio base station bus, and comprising a mobile switching centre, characterized in a first carrier interface configured to communicate carrier data between the radio base station node and the mobile switching centre over a carrier bus according to a layer 1 carrier protocol;

a first bus interface configured to communicate with the second radio base station node over the radio base station bus according to a layer 1 radio base station protocol that is different from the layer 1 carrier protocol;

wherein the carrier data includes user payload data and control data for the second radio base station node, said data for the second radio base station node coupled between the radio base station bus and the carrier bus through the first carrier interface and the first bus interface so that said data for the second radio base station node is communicated as bus data over the radio base station bus.

9. The radio communications system according to claim 8 wherein the carrier data includes control data for the first and second radio base station nodes and wherein the control data for the first and second radio base station nodes is coupled between the radio base station bus and the carrier bus so that the control data for the first and second radio base station nodes is communicated over the radio base station bus.

10. The radio communications system according to claim 8 wherein the carrier data protocol and the radio base station protocol provide different data rates.

11. The radio communication system according to claim 10 wherein the data rate for the radio base station protocol is higher than the data rate for the carrier protocol.

12. The radio communication system according to claim 8 further comprising:

communicating transceiver data between a transceiver interface of the first radio base station node and a transceiver coupled to the first radio base station node.

13. The radio communications system according to claim 12 wherein the transceiver data comprises user payload data communicated between the transceiver and a user terminal wherein the user payload data is coupled between the carrier bus and the transceiver through the first carrier interface of the first radio base station node and the transceiver interface of the first radio base station node without coupling to the radio base station bus.

14. The radio communications system according to claim 13 wherein the carrier data comprises the user payload data.

* * * * *

UNITED STATES PATENT AND TRADEMARK OFFICE
CERTIFICATE OF CORRECTION

PATENT NO.         : 7,181,242 B2
APPLICATION NO. : 10/011666
DATED                 : February 20, 2007
INVENTOR(S)       : Wilcox et al.

It is certified that error appears in the above-identified patent and that said Letters Patent is hereby corrected as shown below:

In The Claims:

Column 6, Claim 1, Line 17: Please correct "wherein the bus"
 To read --wherein the first bus--

Column 6, Claim 1, Line 18: Please correct "commumcate"
 To read --communicate--

Column 6, Claim 2: should read --The radio communications system according to Claim 1 wherein the carrier data includes control data for the first and second radio base station nodes and wherein the control data for the first radio base station node and the control data for the second radio base station node are coupled between the radio base station bus and the carrier bus so that the control data for the first radio base station node and the control data for the second radio base station node are communicated over the radio base station bus between the first and second radio base station nodes.

Column 6, Claim 8: should read -- A radio communications system
 comprising:
a first radio base station node comprising a first bus interface configured to
 communicate over a radio base station bus;
a second radio base station node comprising a second bus interface
 configured to communicate over the radio base station bus; and
a mobile switching centre, wherein a first carrier interface is configured to communicate
 carrier data between the first radio base station node and the mobile switching
 centre over a carrier bus according to a carrier protocol;
wherein the first bus interface is configured to communicate with the second radio base
 station node over the radio base station bus according to a radio base station
 protocol that is different from the carrier protocol;
wherein the carrier data includes user payload data and control data for the second radio
 base station node, said data for the second radio base station node coupled
 between the radio base station bus and the carrier bus through the first carrier
 interface and the first bus interface so that said data for the second radio base
 station node is communicated as bus data over the radio base station bus.--

UNITED STATES PATENT AND TRADEMARK OFFICE
CERTIFICATE OF CORRECTION

PATENT NO. : 7,181,242 B2
APPLICATION NO. : 10/011666
DATED : February 20, 2007
INVENTOR(S) : Wilcox et al.

It is certified that error appears in the above-identified patent and that said Letters Patent is hereby corrected as shown below:

Column 7, Claim 9: Should read --The radio communications system according to Claim 8 wherein the carrier data includes control data for the first and second radio base station nodes and wherein the control data for the first radio base station node and the control data for the second radio base station node are coupled between the radio base station bus and the carrier bus so that the control data for the first radio base station node and the control data for the second radio base station node are communicated over the radio base station bus between the first and second radio base station nodes.--

Signed and Sealed this

Fourth Day of September, 2007

JON W. DUDAS
*Director of the United States Patent and Trademark Office*

UNITED STATES PATENT AND TRADEMARK OFFICE
CERTIFICATE OF CORRECTION

PATENT NO.      : 7,181,242 B2
APPLICATION NO. : 10/011666
DATED           : February 20, 2007
INVENTOR(S)     : Wilcox et al.

It is certified that error appears in the above-identified patent and that said Letters Patent is hereby corrected as shown below:

In Column 6, Line 18, in Claim 1, delete "commumcate" and insert -- communicate --, therefor.

In Column 6, Line 40, in Claim 2, delete "first and second radio base station nodes is" and insert -- first radio base station node and the control data for the second radio base station node are --, therefor.

In Column 6, Line 42, in Claim 2, delete "first and second radio base station nodes is" and insert -- first radio base station node and the control data for the second radio base station node are --, therefor.

In Column 6, Line 43, in Claim 2, delete "bus." and insert -- bus between the first and second radio base station nodes. --, therefor.

In Column 6, Lines 65-66, in Claim 8, delete "A radio base station node in a radio communication system, said system further comprising" and insert -- A radio communications system comprising: a first radio base station node comprising a first bus interface configured to communicate over a radio base station bus; --, therefor.

In Column 7, Line 1, in Claim 8, after "over" delete "a" and insert -- the --, therefor.

In Column 7, Line 1, in Claim 8, after "bus, and" delete "comprising".

In Column 7, Line 2, in Claim 8, after "centre," delete "characterized in" and insert -- wherein --, therefor.

In Column 7, Line 3, in Claim 8, after "interface" insert -- is --.

In Column 7, Line 4, in Claim 8, insert -- first -- before "radio base station".

In Column 7, Line 5, in Claim 8, after "according to a" delete "layer 1".

In Column 7, Line 6, in Claim 8, delete "a first bus interface configured" and insert -- wherein the first bus interface is configured --, therefor.

In Column 7, Line 8, in Claim 8, after "according to a" delete "layer 1".

In Column 7, Line 9, in Claim 8, after "according to a" delete "layer 1".

UNITED STATES PATENT AND TRADEMARK OFFICE
CERTIFICATE OF CORRECTION

PATENT NO. : 7,181,242 B2
APPLICATION NO. : 10/011666
DATED : February 20, 2007
INVENTOR(S) : Wilcox et al.

It is certified that error appears in the above-identified patent and that said Letters Patent is hereby corrected as shown below:

In Column 7, Line 22, in Claim 9, delete "first and second radio base station nodes is" and insert -- first radio base station node and the control data for the second radio base station node are --, therefor.

In Column 7, Line 24, in Claim 9, delete "first and second radio base station nodes is" and insert -- first radio base station node and the control data for the second radio base station node are --, therefor.

In Column 7, Line 25, in Claim 9, delete "bus." and insert -- bus between the first and second radio base station nodes. --, therefor.

Signed and Sealed this

Eighth Day of April, 2008

JON W. DUDAS
*Director of the United States Patent and Trademark Office*